C. C. WOLFE.
DEMOUNTABLE RIM STRUCTURE FOR VEHICLE WHEELS.
APPLICATION FILED JUNE 2, 1916.
1,293,283.
Patented Feb. 4, 1919.
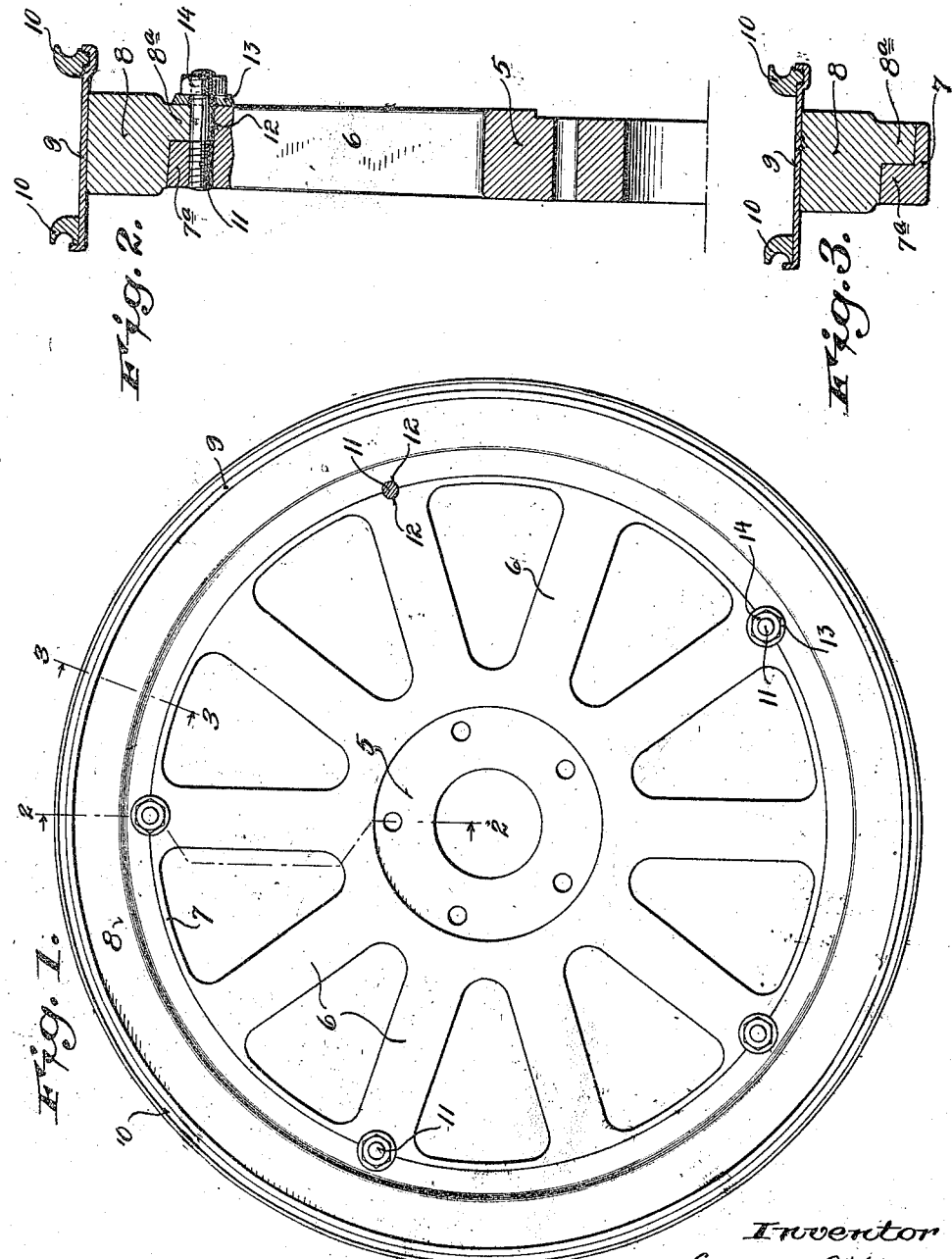
Inventor
Chauncey C. Wolfe.
By Geo. W. Young
Attorneys

UNITED STATES PATENT OFFICE.

CHAUNCEY C. WOLFE, OF MORRISON, WISCONSIN, ASSIGNOR OF ONE-HALF TO ANDREW A. BORNEMANN, OF MORRISON, WISCONSIN.

DEMOUNTABLE-RIM STRUCTURE FOR VEHICLE-WHEELS.

1,293,283.                Specification of Letters Patent.          Patented Feb. 4, 1919.

Application filed June 2, 1916. Serial No. 101,204.

*To all whom it may concern:*

Be it known that I, CHAUNCEY C. WOLFE, a citizen of the United States, and resident of Morrison, in the county of Brown and State of Wisconsin, have invented certain new and useful Improvements in Demountable-Rim Structures for Vehicle-Wheels; and I do hereby declare that the following is a full, clear, and exact description thereof.

The present invention relates to new and useful improvements in vehicle wheels and is directed to the provision of means, more particularly in connection with pneumatic wheels for automobiles or the like, whereby the tire may be readily removed from the body of the wheel to permit the substitution of a fresh tire.

It is in general the object of the present invention to strengthen and otherwise improve the structure of wheels of this type and to improve the readiness and rapidity with which substitution of rims may be procured. The present wheel finds particular application in connection with racing automobiles wherein a minimum time consumed in changing tires assumes a considerable importance, although the wheel is as well adapted for use under general road conditions.

A considerable disadvantage has heretofore been encountered in connection with wheels of the present type having detachable tire carrying rims inasmuch as dirt and grit becomes packed in the joint between the detachable tire carrying portion and the body of the wheel in such manner as to prevent the ready removal of the tire carrying portion. It is therefore a further object of the present invention to provide a joint between the body of the wheel and the tire carrying portion of such nature that it will not become clogged with dirt to prevent ready detachment of the tire carrying member.

With the above and other objects and advantages in view the invention resides more particularly in the novel combination, arrangement and formation of parts more particularly hereinafter described and pointed out in the appended claim.

In the drawings:

Figure 1 is a side elevational view of a wheel constructed in accordance with the present invention.

Fig. 2 is a sectional view taken radially through a portion of the wheel on the line 2—2 of Fig. 1.

Fig. 3 is a transverse sectional view through the peripheral portion of the wheel between the spokes, as indicated by the line 3—3 of Fig. 1.

Referring now more particularly to the accompanying drawings, 5 designates the hub portion of the wheel from which radiates spokes 6 connected at their outer ends by the inner felly section 7. Disposed about the inner felly section 7 is a relatively thicker outer felly section 8 which carries a rim 9 provided with the usual flanges 10 for securing a pneumatic tire thereon.

Opposite side portions of the opposed peripheral faces of the felly sections are offset to form consequent lapped flange portions $7^a$ and $8^a$ respectively, the flange $7^a$ of the inner felly section being disposed at the inner side of the wheel. The felly sections are secured together by bolts 11 passed transversely through the felly structure with their axes substantially coincident with the peripheral face of the flange $8^a$ of the outer felly section, whereby between this flange and the inner felly section, the bolts lie in transverse grooves 12 in the peripheral faces of these portions, the bolts being permanently secured by threaded engagement in the inner felly section adjacent its flange $7^a$. The outer felly section is secured by washer plates 13 on the bolts at the outer side of said section, and nuts 14 threaded on the adjacent ends of the bolts to bear against the washer. The axes of the bolts intersect the axes of respective spokes 6, and inasmuch as the inner felly section is materially strengthened at the juncture of the spokes, it may thus be formed of minimum width, this disposition of the bolts also serving to impart various strains directly to the spokes.

To provide such contact between the felly sections as to prevent the introduction of any foreign material which might tend to bind the sections against ready detachment, the peripheral faces of the sections, including their offset portions are oppositely beveled whereby upon placing the sections together and tightening the nuts 14, a wedging engagement of the faces is procured to provide a tight seam, and should any foreign matter possibly become lodged between the faces, only a slight binding tendency would occur inasmuch as the opposite face portions move laterally apart in detaching the outer section.

The present wheel is preferably made entirely of a relatively light metal composition.

From the foregoing structure it is seen that the outer felly section carrying the tire rim may be very readily removed and replaced as desired and attention is particularly directed to the manner in which the strain incident to travel of the wheel is distributed uniformly throughout the wheel, and is in the most part imparted directly to the spokes.

I claim:

A wheel including a felly comprising a rim carrying outer section, a spoke carrying inner section, the opposed peripheral faces of said sections being oppositely offset to form lapped flanges, portions of the peripheral face of the flange of the outer section being provided with transverse grooves, portions of the peripheral face of the inner section being provided with opposed grooves adapted to define cylindrical openings in conjunction with the grooves of the outer section flange, bolts passed through and threaded in the flange of the inner section and passed through the grooves and extended outwardly thereof, and means on the extended ends of the bolts for securing the felly sections against lateral movement.

In testimony that I claim the foregoing I have hereunto set my hand at Morrison, in the county of Brown and State of Wisconsin, in the presence of two witnesses.

CHAUNCEY C. WOLFE.

Witnesses:
MAX FUELLE,
FRED C. TESKE.